US008821831B2

(12) United States Patent
Takayasu et al.

(10) Patent No.: US 8,821,831 B2
(45) Date of Patent: Sep. 2, 2014

(54) PROCESS FOR PRODUCING CRYSTALLINE TITANIUM OXIDE COATING FILM THROUGH ELECTROLYTIC ANODIZING

(75) Inventors: Teruki Takayasu, Ikoma (JP); Kinji Onoda, Ikoma (JP)

(73) Assignee: Showa Co., Ltd., Nara (JP)

( * ) Notice: Subject to any disclaimer, the term of this patent is extended or adjusted under 35 U.S.C. 154(b) by 7 days.

(21) Appl. No.: 11/990,756

(22) PCT Filed: Aug. 25, 2005

(86) PCT No.: PCT/JP2005/015409
§ 371 (c)(1),
(2), (4) Date: Aug. 7, 2008

(87) PCT Pub. No.: WO2007/023543
PCT Pub. Date: Mar. 1, 2007

(65) Prior Publication Data
US 2009/0035213 A1  Feb. 5, 2009

(51) Int. Cl.
C01G 23/04 (2006.01)
C23C 28/04 (2006.01)
B01J 35/00 (2006.01)
B01J 21/06 (2006.01)
C23C 8/34 (2006.01)
B01J 37/02 (2006.01)
C25D 11/26 (2006.01)
C23C 8/80 (2006.01)
C23C 8/24 (2006.01)
B01J 27/24 (2006.01)

(52) U.S. Cl.
CPC .......... *C23C 8/80* (2013.01); *B01J 35/004* (2013.01); *B01J 21/063* (2013.01); *C23C 8/34* (2013.01); *B01J 37/0226* (2013.01); *C25D 11/26* (2013.01); *C23C 8/24* (2013.01); *B01J 27/24* (2013.01)
USPC .......... 423/609; 423/409; 423/411; 423/608; 423/610; 205/188

(58) Field of Classification Search
USPC .......... 423/609, 610, 608, 409, 411; 205/188
IPC ..... C23C 8/00,8/10, 14/14, 14/16, 28/04; C25D 11/16; B01J 21/06; C01G 23/04, 23/47, 27/02
See application file for complete search history.

(56) References Cited

U.S. PATENT DOCUMENTS 2,960,642 A  11/1960  De Rudnay
4,851,203 A *  7/1989  Bachelard et al. ............ 423/290

(Continued)

FOREIGN PATENT DOCUMENTS

GB  2063920  6/1981
JP  A-63-018099  1/1988

(Continued)

OTHER PUBLICATIONS

English abstract of JP63-237816, Hosonuma et al., 1988.*

(Continued)

*Primary Examiner* — Jun Li
(74) *Attorney, Agent, or Firm* — Posz Law Group, PLC

(57) ABSTRACT

The invention concerns a method for producing a crystalline titanium oxide film useful as a photocatalyst, a photovoltaic element, etc. The crystalline titanium oxide film is produced by steps (a-1) and (b): (a-1) a step of heating titanium or titanium alloy under conditions (1) or (2) to form titanium nitride on the surface of the titanium or titanium alloy; (1) in an atmosphere of nitrogen and/or ammonia gas in the presence of a carbon material acting as an oxygen trapping agent; or (2) in an atmosphere where a pressure is reduced to discharge atmospheric gas, and then nitrogen and/or ammonia gas are/is introduced in the presence of a carbon material acting as an oxygen trapping agent; and (b) a step of immersing the titanium or titanium alloy obtained in step (a-1) above in an electrolyte containing an inorganic acid and/or organic acid, and applying voltage for anodization.

7 Claims, 3 Drawing Sheets

(56) References Cited

U.S. PATENT DOCUMENTS

| | | | |
|---|---|---|---|
| 5,417,952 A * | 5/1995 | Koc et al. | 423/380 |
| 5,487,922 A | 1/1996 | Nieh et al. | |
| 6,183,255 B1 * | 2/2001 | Oshida | 433/201.1 |
| 6,344,127 B1 | 2/2002 | Itoh | |
| 2002/0169076 A1 * | 11/2002 | Takeshi et al. | 502/350 |
| 2004/0161917 A1 * | 8/2004 | Hizawa | 438/592 |
| 2004/0251140 A1 | 12/2004 | Chung | |

FOREIGN PATENT DOCUMENTS

| | | | |
|---|---|---|---|
| JP | 63-237816 | * 10/1988 | B23H 5/02 |
| JP | A-03-240973 | 10/1991 | |
| JP | A-03-109497 | 4/1996 | |
| JP | A-08-109497 | 4/1996 | |
| JP | A-08-246192 | 9/1996 | |
| JP | A-11-106952 | 4/1999 | |
| JP | A-11-315398 | 11/1999 | |
| JP | A-2000-271493 | 10/2000 | |

OTHER PUBLICATIONS

English translation of Yamaguchi (JP63-018099).*

Onoda et al., *Preparation and High Performance of Titanium Oxide Film by Anodic Oxidation Treatment*, Institute of Advanced Energy, Kyoto University, Nara Prefectural Institute of Industrial Technology, 7$^{st}$ Electrochemical Society, Mar. 2004.

Onoda et al., *Preparation of Anatase TiO2 Films by Amodic Oxidation Treatment and their Photocatalytic Activities*, Institute of Advanced Energy, Kyoto University, Nara Prefectural Institute of Industrial Technology, 72$^{nd}$ Electrochemical Society, Apr. 2005.

Onoda et al., *The Effect of Applied Voltage and Nitriding Treatment on Titanium Metal Oxide Film by Anodic Oxidation*, Institute of Advanced Energy, Kyoto University, Nara Prefectural Institute of Industrial Technology, 84$^{th}$ Chemical Society for Japan, Mar. 2004.

Onoda et al., *Preparation of High Performance Titanium Oxide Films by Anodization Process*, Institute of Advanced Energy, Kyoto University, Nara Prefectural Institute of Industrial Technology, 204$^{th}$ Electrochemical Society, Oct. 2003.

International Search Report dated Nov. 15, 2005 in corresponding PCT Patent Application No. PCT/JP2005/015409.

Supplementary European Search Report dated Apr. 26, 2010 issued from the European Patent Office in corresponding European patent application No. 05780933.7.

Office Action mailed Jan. 29, 2010 from China Patent Office in corresponding CN application No. 2005800513529 (Partial English translation provided).

"Coloring of Titanium," Titanium Industry Development, Oct. 31, 1997, 5$^{th}$ Period, pp. 16-17.

Shin et al., "Diffusion barrier property of TiN and TiN/Al/TiN films deposited with FMCVD for Cu interconnection in ULSI," Science and Technology of Advanced Materials 5, pp. 399-405 (2004).

Office Action issued on Jul. 6, 2011 in the corresponding Korean patent application No. 10-2008-7006550.

P. Chen et al., "Preparation and phase transformation of highly ordered TiO$_2$ nanodot arrays on sapphire substrates," Applied Physics Letters vol. 84, No. 19, pp. 3888-3890 (May 10, 2004).

* cited by examiner

PROCESS FOR PRODUCING CRYSTALLINE TITANIUM OXIDE COATING FILM THROUGH ELECTROLYTIC ANODIZING

TECHNICAL FIELD

The present invention relates to a method for manufacturing a crystalline titanium oxide film useful as a photocatalyst, a photovoltaic element, etc. Moreover, the present invention relates to crystalline titanium oxide useful as a photocatalyst, a photovoltaic element, etc.

BACKGROUND OF THE INVENTION

Crystalline titanium oxides of a rutile type crystalline structure, a brookite type crystalline structure, an anatase-type crystalline structure, etc., can convert light energy to chemical or electrical energy, and are expected to find applications in various fields as photocatalysts, photovoltaic elements, etc. Among the crystalline titanium oxides, it is known that the anatase-type titanium oxide has excellent photocatalytic activities and the like, and is a highly useful material.

As a method for producing a titanium oxide film on the surface of titanium or titanium alloys, a method involving anodizing titanium or titanium alloys in a conventional electrolyte of, for example, phosphoric acid or the like, is generally known. However, according to such a prior-art processes for producing a titanium oxide film, it is found that amorphous titanium oxide is generated and anatase-type crystalline titanium oxide is not generated.

In recent years, processes for producing a crystalline titanium oxide film having, for example, an anatase-type crystalline structure, have been vigorously examined, and various methods have been proposed. For example, Patent Document 1 proposes a process involving anodizing titanium in a diluted acidic solution, and then heating the obtained anodized specimens in an oxidizing atmosphere. Patent Document 2 discloses a process involving anodizing titanium in electrolytes composed of acids and fine particles having photocatalytic activities at the voltage equivalent to or higher than the spark discharging voltage. Moreover, Patent Document 3 discloses a process involving anodizing titanium in an electrolyte composed of sulfuric acid, phosphoric acid, and hydrogen peroxide. However, these processes are disadvantageous in that they are complicated and impractical. Furthermore, these processes pose problems in that the generation of non-uniform titanium oxide and the mixture of titanium oxide (titanium low valence oxide) cannot be prevented; the anatase-type titanium oxide obtained has poor photocatalytic properties; the amount of anatase-type titanium oxide obtained is small; etc.

Moreover, a process for producing a crystalline titanium oxide film has been proposed that involves heating titanium in a nitrogen atmosphere, and then anodizing the obtained anodized specimens in a electrolyte containing an acid. However, merely anodizing the titanium heated in a nitrogen atmosphere is disadvantageous in that the crystalline titanium oxide is not uniform and the amount of crystalline titanium oxide obtained is small.

In view of such prior-art techniques, a demand exists for establishing a method for producing a crystalline titanium oxide film that is suitable for industrial production; that forms a great deal of crystalline titanium oxide that has excellent photocatalytic activities; and the like.

Patent Document 1

Japanese Unexamined Patent Publication No. Hei. 8-246192

Patent Document 2

Japanese Unexamined Patent Publication No. Hei. 11-1006952

Patent Document 3

Japanese Unexamined Patent Publication No. Hei. 11-315398

DISCLOSURE OF THE INVENTION

Problem to be Solved by the Invention

The present invention aims to solve the above-described problems of prior-art techniques. Specifically, the present invention aims to provide a method for producing a crystalline titanium oxide film that is suitable for industrial production; that forms a large amount of crystalline titanium oxide; that has excellent photocatalytic activities; and that is useful as a photocatalyst, a photovoltaic element, and the like.

Means for Solving the Problems

The present inventors carried out extensive research in order to overcome the above-described problems, and obtained the following findings. More specifically, a crystalline titanium oxide film can be obtained that can form a large amount of anatase-type crystalline titanium oxide and that is suitable for photocatalysts, photovoltaic elements, and the like through step (a-1) of reacting titanium or titanium alloy with nitrogen and/or ammonia gas under specific conditions or step (a-2) of subjecting titanium or titanium alloy to PVD or CVD processing, thereby forming titanium nitride on the surface of the titanium or the titanium alloy, and subsequently, anodizing the titanium or the titanium alloy obtained in step (a-1) or (a-2) under specific conditions.

The present invention has been accomplished by further improvements based on these findings.

More specifically, the present invention provides the following process for producing a crystalline titanium oxide film, and a crystalline titanium oxide film:

Item 1. A process for producing a crystalline titanium oxide film comprising the following steps (a-1) and (b):

(a-1) a step of heating titanium or titanium alloy under either of the following conditions (1) to (3) to form titanium nitride on the surface of the titanium or titanium alloy;

(1) in an atmosphere of nitrogen and/or ammonia gas in the presence of an oxygen trapping agent;

(2) in an atmosphere where a pressure is reduced to discharge atmospheric gas, and then nitrogen and/or ammonia gas are/is introduced; or (3) in an atmosphere where a pressure is reduced to discharge atmospheric gas, and then nitrogen and/or ammonia gas is introduced in the presence of oxygen trapping agent; and (b) a step of immersing the titanium or titanium alloy obtained in step (a-1) above in an electrolyte containing an inorganic acid and/or organic acid, and applying voltage for anodization.

Item 2. A process for producing a crystalline titanium oxide film comprising the following steps (a-2) and (b):
(a-2) subjecting titanium or titanium alloy to PVD or CVD processing to form titanium nitride on a surface of the titanium or titanium alloy; and
(b) a step of immersing the titanium or titanium alloy obtained in step (a-2) above in an electrolyte containing an inorganic acid and/or organic acid, and applying voltage for anodization.
Item 3. The process for producing a crystalline titanium oxide film according to Item 1 or 2, wherein the crystalline titanium oxide includes an anatase-type titanium oxide.
Item 4. The process for producing a crystalline titanium oxide film according to Item 1, wherein the titanium or titanium alloy is heated at 750° C. or higher in step (a-1).
Item 5. The process for producing a crystalline titanium oxide film according to Item 1 or 2, wherein the inorganic acid and/or organic acid used in step (b) has an etching effect on titanium.
Item 6. The process for producing a crystalline titanium oxide film according to Item 1 or 2, wherein voltage equal to or higher than the spark discharging voltage is applied for the anodization in step (b).
Item 7. The process for producing a crystalline titanium oxide film according to Item 1 or 2, wherein the electrolyte used in step (b) contains at least one acid selected from the group consisting of sulfuric acid, phosphoric acid, and hydrofluoric acid.
Item 8. The process for producing a crystalline titanium oxide film according to Item 1 or 2, wherein the electrolyte used in step (b) further comprises hydrogen peroxide.
Item 9. The process for producing a crystalline titanium oxide film according to Item 1 or 2, wherein the crystalline titanium oxide film is a material for a photocatalyst or photovoltaic element.
Item 10. A crystalline titanium oxide film, which is produced by the following steps:
(a-1) a step of heating titanium or titanium alloy under either of the following conditions (1) to (3), to form titanium nitride on a surface of the titanium or titanium alloy;
　(1) in an atmosphere of nitrogen and/or ammonia gas in the presence of an oxygen trapping agent;
　(2) in an atmosphere where a pressure is reduced to discharge atmospheric gas, and then nitrogen and/or ammonia gas are/is introduced; or
　(3) in an atmosphere where a pressure is reduced to discharge atmospheric gas, and then nitrogen and/or ammonia gas are/is introduced in the presence of an oxygen trapping agent; and
(b) a step of immersing the titanium or titanium alloys obtained in step (a-2) above in an electrolyte containing an inorganic acid and/or organic acid, and applying voltage for anodization.
Item 11. A crystalline titanium oxide film, which is produced by the following steps:
(a-2) subjecting titanium or titanium alloy to PVD or CVD processing to form titanium nitride on a surface of the titanium or titanium alloy, and
(b) a step of immersing the titanium or titanium alloy obtained in step (a-2) above in an electrolyte containing an inorganic acid and/or organic acid, and applying voltage for anodization.
Item 12. The crystalline titanium oxide film according to Item 10 or 11, wherein the crystalline titanium oxide film is a material for a photocatalyst or a photovoltaic element.

BEST MODE FOR CARRYING OUT THE INVENTION

Figure 1:
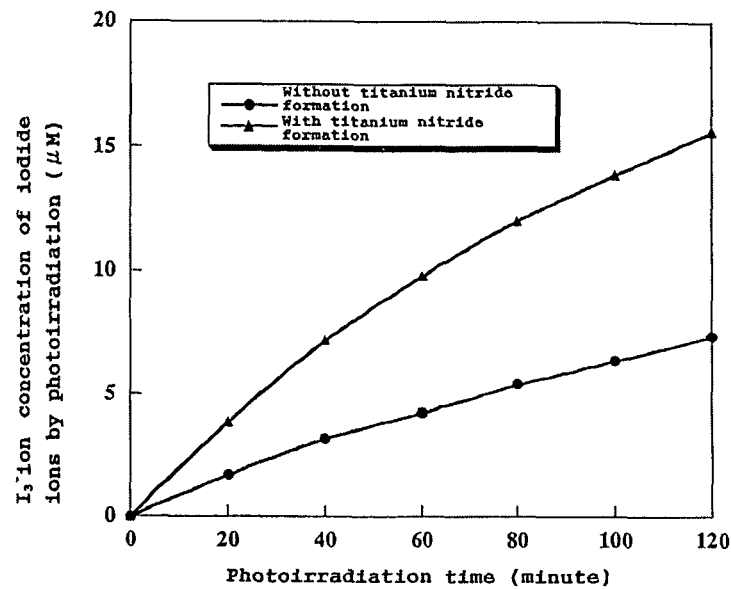
FIG. 1 is a view showing the photocatalytic activities of a crystalline titanium oxide film produced using the electrolyte 1 (an aqueous solution containing 1.5 M sulfuric acid, 0.3 M phosphoric acid, and 0.3 M hydrogen peroxide) in Example 3. The photocatalytic activities were evaluated by measuring the oxidation amount of iodide ions by photoirradiation ($I_3^-$ ion concentration: μM).

Hereinafter, the present invention will be described in detail. The production process for a crystalline titanium oxide film of the present invention includes step (a-1) or (a-2) and step (b) described later. Hereinafter, the present invention will be described for each step. It should be noted that titanium and titanium alloy may be simply referred to as a titanium material hereinafter in this specification.

1. Step (a-1) or (a-2)

In step (a-1) or (a-2), titanium nitride is formed on the surface of titanium or titanium alloy.

There are no limitations on the types of titanium alloy to be used in the present invention. Mentioned as the titanium alloy are, for example, Ti-6Al-4V, Ti-0.5Pd, etc. The titanium material to be used in the present invention may take any form, such as a plate, rod, etc., and may be formed into a predetermined shape.

In the present invention, before performing step (a-1) or (a-2), the titanium material may be subjected to pretreatment for removing a passive film formed on the surface thereof. Such pretreatment allows the efficient formation of titanium nitride in step (a-1) or (a-2). For example, physical processing, such as electropolishing, shot blasting, etc.; etching using acid, such as hydrofluoric acid, sulfuric acid; and the like, can be mentioned as such pretreatment.

The processing prescribed in step (a-1) or (a-2) can prevent the insufficient or non-uniform formation of nitride on the surface of the titanium material due to the presence of oxygen. Therefore, a titanium nitride layer excellent in terms of quality and amount can be formed.

In step (a-1) or (a-2), a titanium nitride layer is formed on the surface of the titanium material in such a manner that the thickness is generally about 0.1 to 100 μm, preferably about 0.5 to 50 μm, and more preferably about 1 to 30 μm.

There are no limitations on the type of titanium nitride formed on the surface of the titanium material in step (a-1) or (a-2). TiN, $Ti_2N$, $\alpha\text{-}TiN_{0.3}$, $\eta\text{-}Ti_3N_{2-x}$, $\zeta\text{-}Ti_4N_{3-x}$ (wherein x is a numerical value ranging from 0 (inclusive) to 3 (exclusive)), a mixture thereof, an amorphous titanium nitride, etc., can be mentioned as examples of the titanium nitride. Among the above, TiN, Ti$_2$N, and a mixture thereof are preferable, TiN and a mixture of TiN and Ti$_2$N are more preferable, and TiN is particularly preferable.

Hereinafter, the processes will be divided into step (a-1) and step (a-2) and the details of specific processes of forming titanium nitride on the surface of a titanium material will be described.

Step (a-1)

In step (a-1), the titanium material is heated under either of the following conditions (1) to (3):

(1) in an atmosphere of nitrogen and/or ammonia gas in the presence of an oxygen trapping agent;

(2) in an atmosphere where the pressure is reduced to discharge atmospheric gas, and then nitrogen and/or ammonia gas are/is introduced; and (3) in an atmosphere where the pressure is reduced to discharge atmospheric gas, and then nitrogen and/or ammonia gas are/is introduced in the presence of an oxygen trapping agent.

Hereinafter, specific embodiments of heating the titanium material under condition (1), (2), or (3) will be described.

Condition (1)

For the heat treatment of a titanium material under the above-described Condition (1), a titanium material is heated in an atmosphere of nitrogen and/or ammonia gas in the presence of an oxygen trapping agent.

As the oxygen trapping agent, a substance or gas whose affinity with oxygen is higher than the titanium material may be used. For example, a carbon material; metal powder; hydrogen gas, or the like can be mentioned. These oxygen trapping agents may be used alone or as a mixture of two or more thereof.

There are no limitations on the carbon material, and, for example, a graphite carbon, amorphous carbon, carbon having an intermediate crystalline structure, and the like can be mentioned. Such carbon material may take any form, such as a plate, foil, powder, or the like.

Specifically mentioned as the above-mentioned metal powder are metal powders of titanium, titanium alloy, chromium, chromium alloy, molybdenum, molybdenum alloy, vanadium, vanadium alloy, tantalum, tantalum alloy, zirconium, zirconium alloy, silicon, silicon alloy, aluminum, aluminum alloy, and the like. Among metals, preferable are metals with a high oxygen affinity (specifically, metal powders of titanium, titanium alloy, chromium, chromium alloy, zirconium, zirconium alloy, aluminum, aluminum alloy, and the like), and more preferable are titanium and titanium alloy. The above-mentioned metal powder may be used alone or in combination of two or more thereof. In the case of a metal powder, the average particle diameter thereof is, for example, 0.1 to 1,000 μm, preferably 10 to 1,000 μm, and more preferably 10 to 100 μm. By using a metal powder whose particle diameter is within the above-mentioned range, nitride can be more effectively formed on the surface of the titanium material.

Methods for heating the titanium material in an atmosphere of nitrogen and/or ammonia gas in the presence of an oxygen trapping agent can be determined according to the type of oxygen trapping agent to be used. For example, in the case of using a carbon material and/or a metal powder as the oxygen trapping agent, a method involving bringing the carbon material and/or the metal powder into contact with the titanium material to thereby cover the surface, and heating the treated specimens in an atmosphere of nitrogen gas can be mentioned. When using hydrogen gas as the oxygen trapping agent, a method involving heating the titanium material while introducing hydrogen gas in an atmosphere of nitrogen and/or ammonia gas can be mentioned.

The heating temperature of the titanium material in an atmosphere of nitrogen and/or ammonia gas is, for example, 500° C. or higher, preferably 750 to 1050° C., and more preferably 850 to 950° C.

The heating atmosphere may be a nitrogen gas atmosphere, an ammonia gas atmosphere, or a mixed atmosphere of nitrogen gas and ammonia gas. In view of producing titanium nitride with ease and at low cost, a nitrogen gas atmosphere is preferable. When the heating atmosphere is a nitrogen gas atmosphere, the pressure of the gas may generally be, but is not limited to, about 0.1 to 100 MPa, preferably about 0.1 to 10 MPa, and more preferably about 0.1 to 1 MPa.

The heating time of the titanium material in the heat treatment can be adjusted to generally 1 minute to 12 hours, preferably 1 minute to 8 hours, and more preferably 10 minutes to 6 hours.

Condition (2)

For the heat treatment of a titanium material under the above-described Condition (2), the titanium material is heated in an atmosphere in which the pressure is reduced to discharge atmospheric gas, and then, nitrogen and/or ammonia gas are/is introduced.

Here, the discharge of atmospheric gas by reducing the pressure is performed by reducing the inside of a furnace to generally 100 Pa, preferably 10 Pa, and more preferably 1 Pa. Such pressure reduction can be performed using a known device, such as a vacuum pump or the like.

By supplying nitrogen gas, ammonia gas, or a mixture thereof to the heating tank whose pressure has been reduced as described above, the pressure of the furnace is recovered. The titanium material is heated in the atmosphere thus prepared in the furnace. In view of producing titanium nitride with ease and at low cost, it is preferable to prepare a nitrogen atmosphere in the furnace by supplying nitrogen gas.

The nitrogen gas pressure, heating temperature, heating time, and the like at the time of the heat treatment are the same as those in the above-described Condition (1).

Condition (3)

For the heat treatment of a titanium material under the above-described Condition (3), the titanium material is heated in the presence of an oxygen trapping agent in an atmosphere in which the pressure is reduced to discharge atmospheric gas, and then, nitrogen and/or ammonia gas are/is introduced.

More specifically, the heat treatment of a titanium material performed under Condition (3) is a combination of a heat treatment in the presence of an oxygen trapping agent and a heat treatment in an atmosphere in which the pressure is reduced to discharge atmospheric gas, and thereafter nitrogen and/or ammonia gas are/is introduced, and can be performed by suitably combining Condition (1) and Condition (2).

Step (a-2)

In step (a-2), the titanium material is subjected to PVD (physical vapor deposition) or CVD (chemical vapor deposition).

There are no limitations on PVD insofar as titanium nitride can be formed on the surface of the titanium material. For example, ion plating, sputtering, and the like can be mentioned. For CVD processing, thermal CVD, plasma CVD, laser CVD, or the like can be widely used.

Titanium nitride is formed on the surface of the titanium material by PVD or CVD processing using known procedures.

Step (b)

In step (b), the titanium or titanium alloy obtained in step (a-1) or step (a-2) is immersed in an electrolyte containing an inorganic acid and/or organic acid, and then voltage is applied for anodization.

There are no limitations on the electrolyte used in step (b), insofar as the electrolyte is an aqueous solution containing either or both of inorganic acid and organic acid. Preferable as the electrolyte is an aqueous solution containing an inorganic acid that can etch titanium and/or an organic acid that can etch titanium. For example, sulfuric acid, phosphoric acid, hydrofluoric acid, hydrochloric acid, nitric acid, aqua regia, and the like can be mentioned as inorganic acids that can etch titanium. Oxalic acid, formic acid, citric acid, trichloroacetic acid, and the like can be mentioned as organic acids that can etch titanium. Among these acids, sulfuric acid, phosphoric acid, hydrochloric acid, hydrofluoric acid, oxalic acid, and trichloroacetic acid are preferable, and sulfuric acid, phosphoric acid, and hydrofluoric acid are more preferable. These acids can be used alone or in combination of two or more. Moreover, these acids may be used in a combination of two or more irrespective of type, i.e., organic acid or inorganic acid. An example of a preferable electrolyte containing two or more acids is an aqueous solution containing sulfuric acid and phosphoric acid.

The proportions of the above-mentioned acids in the electrolyte vary according to the type of acid to be used, the anodizing conditions, and the like, and are generally 0.01 to 10 M, preferably 0.1 to 10 M, and more preferably 1 to 10 M based on the total amount of the above-mentioned acid(s). For example, in the case of an electrolyte containing sulfuric acid and phosphoric acid, an electrolyte containing 1 to 8 M sulfuric acid and 0.1 to 2 M phosphoric acid can be mentioned.

It is preferable for the electrolyte to contain hydrogen peroxide in addition to the organic acid and/or inorganic acid. When hydrogen peroxide is contained in an electrolyte, a crystalline titanium oxide layer can be more effectively prepared. When hydrogen peroxide is incorporated in an electrolyte, the proportion of hydrogen peroxide is not limited, and, for example, may be 0.01 to 5 M, preferably 0.01 to 1 M, and more preferably 0.1 to 1 M.

As an example of a preferable electrolyte to be used in anodization in step (b), an aqueous solution that contains 1 to 8 M sulfuric acid, 0.1 to 2 M phosphoric acid, and 0.1 to 1 M hydrogen peroxide can be mentioned.

The titanium or titanium alloy obtained in step (a-1) or (a-2) is immersed in the electrolyte, and voltage is applied for anodization, thereby obtaining crystalline titanium oxide films. As the voltage to be applied during anodization, for example, a voltage ranging from about 50 to 200 V may be applied for about 1 to 60 minutes.

In order to increase the formation amount of, particularly, an anatase-type titanium oxide, it is preferable to apply a voltage that is equal to or higher than the spark discharge voltage during anodization. As a voltage equal to or higher than the spark discharging voltage, generally 100 V or higher can be mentioned, and 150 V or higher is preferable. Such electrolytic anodization can be performed by, for example, increasing the voltage at a constant rate to reach the spark discharging voltage, and then applying a voltage equal to or higher than the spark discharging voltage for a predetermined time. The rate of increasing the voltage to reach the spark discharging voltage is generally set to 0.01 to 1 V/second, preferably 0.05 to 0.5 V/second, and more preferably 0.1 to 0.5 V/second. Moreover, the time for applying the voltage equal to or higher than the spark discharging voltage is generally set to 1 minute or more, preferably 1 minute to 60 minutes, and more preferably 10 to 30 minutes.

As described above, the titanium or titanium alloys obtained in step (a-1) or (a-2) is subjected to anodization, and a crystalline titanium oxide film whose film thickness is about 1 to 100 µm is formed on the surface of the titanium material. In particular, according to the process of the present invention, a forming film containing a great deal of crystalline titanium oxide, particularly, an anatase-type titanium oxide film, can be formed. Therefore, the process of the present invention is useful as a production process for an anatase-type titanium oxide film.

Moreover, the anatase-type crystalline titanium oxide film and the like obtained by the process of the present invention have excellent properties as photocatalysts, photovoltaic elements, and the like, and thus are useful as photocatalyst materials, photovoltaic element materials, and the like.

INDUSTRIAL APPLICABILITY

According to the present invention, a forming film which has a large film thickness and can form a great deal of crystalline titanium oxide can be easily produced. The crystalline titanium oxide film obtained by the present invention can effectively exhibit photocatalytic properties and/or photovoltaic properties. Therefore, the process of the present invention is useful as a production process for photocatalyst materials or photovoltaic element materials.

EXAMPLES

The present invention will be described in more detail below by way of Examples; however, the scope of the invention is not limited by these Examples.

Example 1

1. Pretreatment of Titanium Metal Sheet

Titanium metal sheets (19.8 $cm^2$ in surface area, and 1 mm in thickness) were subjected to an alkaline electrolytic treatment using a known method to dissolve the oil/fat contaminants on the titanium metal sheets. Subsequently, the titanium metal sheets were immersed in a 5%-by-weight-hydrofluoric-acid-containing aqueous solution to etch the surface of each titanium metal sheet.

2. Formation of Titanium Nitride

Titanium nitride was formed using an electric furnace (model number: FUA113 DB, a product of ADVANTEC Co., Ltd.). More specifically, a pretreated titanium metal sheet was placed on a disk-shaped carbon sheet (12 cm in diameter and 8 mm in thickness) that was set in the electric furnace of the device, and then another disk-shaped carbon sheet (12 cm in diameter and 8 mm in thickness) was placed on the titanium metal sheet. Subsequently, the electric furnace of the above-mentioned device was filled with nitrogen gas (pressure in the furnace: atmospheric pressure) in accordance with a conventional step, and heated to 950° C. at a rate of 10° C./min, and maintained at 950° C. for either 1 hour or 6 hours to complete heat treatment. Further, for comparison, a titanium nitride formation treatment was conducted in the same manner as described above without using a carbon sheet.

The X-ray diffraction intensity of the titanium nitride phase in the (200) plane of the titanium nitride formed on the titanium metal sheet was measured. The results are shown in Table 1. The results indicate that the titanium nitride (TiN) phase is effectively formed by a heat treatment in the presence of a carbon sheet that acts as an oxygen trapping agent.

TABLE 1

| Heat Treatment Conditions | X-ray Diffraction Intensity (cps) of Titanium Nitride (200) Plane | |
| --- | --- | --- |
| | With Oxygen-Trapping Agent (Carbon Sheet) | Without Oxygen-Trapping Agent (No Carbon Sheet) |
| 950° C., 1 hour | 1,008 | 497 |
| 950° C., 6 hours | 2,392 | 87 |

3. Formation of Crystalline Titanium Oxide Film

Metal titanium sheets having titanium nitride formed on the surface thereof using a heat treatment at 950° C. for 6 hours, in the presence or absence of an oxygen-trapping agent (carbon sheet) in a nitrogen atmosphere, were subjected to anodizing. More specifically, the titanium metal sheets were immersed into an aqueous solution containing 1.5 M sulfuric acid, 0.3 M phosphoric acid, and 0.3 M hydrogen peroxide. The titanium metal sheet was connected to an anode and another titanium metal sheet was connected to a cathode, and anodization was performed using a direct-current power source. The applied voltage was increased at a rate of 95 mV/s to 150 V and maintained at a fixed voltage for 10 minutes. During anodization, the spark discharge was observed.

The integrated X-ray diffraction intensity of the anatase-type titanium oxide phase in the (101) plane of the anodized titanium sheet was measured. The results are shown in Table 2. The results reveal that an anatase-type titanium oxide film is effectively obtained when a titanium metal sheet comprising titanium nitride formed using a heat treatment in the presence of an oxygen-trapping agent in a nitrogen atmosphere is used as the titanium metal that is to be subjected to anodizing.

TABLE 2

| Titanium Metal Sheet for Anodizing | X-ray Diffraction Integrated Intensity of Anatase-type Titanium Oxide (101) Plane |
| --- | --- |
| Titanium Metal Sheet Comprising Titanium Nitride Formed in a Nitrogen Atmosphere, in the Presence of an Oxygen Trapping Agent (Carbon Sheet) | 17886 |
| Titanium Metal Sheet Comprising Titanium Nitride Formed in a Nitrogen Atmosphere, in the Absence of an Oxygen Trapping Agent (No Carbon Sheet) | 0 |

Example 2

1. Pretreatment of Titanium Metal Sheet

Titanium metal sheets (19.8 cm² in surface, and 1 mm in thickness) were immersed in an n-hexane solution to subject the same to a degreasing treatment.

2. Formation of Titanium Nitride

Titanium nitride was formed on the sheets using an electric furnace (model number: GR-6156-15V-S, a product of Koyo Thermo Systems Co., Ltd.). More specifically, the pre-treated titanium metal sheets were placed in the electric furnace. Subsequently, the pressure in the electric furnace was reduced to 10 Pa or less, and then, a stream of nitrogen gas having a purity of 99.99% was introduced into the electric furnace to create a nitrogen gas atmosphere in which the gas pressure was the same as the atmospheric pressure. Subsequently, the titanium sheets placed in the electric furnace were heated to 950° C. for 6 hours to form a titanium nitride layer on the titanium metal sheets.

3. Formation of Crystalline Titanium Oxide Film

Metal titanium sheets having a titanium nitride layer formed thereon as described above were immersed into an aqueous solution containing 1.5 M sulfuric acid, 0.1 M phosphoric acid, 0.3 M hydrogen peroxide, and 0.3 M hydrofluoric acid. The titanium metal sheet with the titanium nitride layer was connected to an anode and another titanium metal sheet was connected to a cathode, and anodization was performed using a direct-current power source. The applied voltage was raised at a rate of 95 mV/s to 50 V and maintained for 10 minutes. During anodization, no spark discharge was observed.

The integrated X-ray diffraction intensity of the anatase-type titanium oxide phase in the (101) plane of the anodized titanium sheet was 248. It was confirmed that an anatase-type titanium oxide crystal phase could be obtained even when the titanium sheet was anodized at a low applied voltage of 50 V. The results reveal that the production efficiency of the anatase-type titanium oxide crystal phase can be improved by adding hydrofluoric acid to the electrolyte.

Example 3

1. Pretreatment of Metal Titanium Sheet and Formation of Titanium Nitride

Metal titanium sheets (19.8 cm² in surface area, and 1 mm in thickness) were pre-treated and titanium nitride was formed in the same manner as described above in Example 2, "1. Pretreatment of Titanium Metal Sheet" and "2. Formation of Titanium Nitride".

2. Formation of Crystalline Titanium Oxide Film

Metal titanium sheets with the titanium nitride layer formed thereon as described above were immersed into electrolytes 1 or 2. The titanium metal sheet was connected to an anode and another titanium metal sheet was connected to a cathode, and anodization was performed using a direct-current power source. The applied voltage was raised at a rate of 95 mV/s to 150 V and maintained for 10 minutes. During anodization, the spark discharge was observed. Thus, a crystalline titanium oxide film was formed on a metal titanium sheet.

Electrolyte 1: Aqueous solution comprising 1.5 M sulfuric acid, 0.3 M phosphoric acid, and 0.3 M hydrogen peroxide.
Electrolyte 2: Aqueous solution comprising 1.5 M sulfuric acid, 0.1 M phosphoric acid, and 0.3 M hydrogen peroxide.

The following tests were performed to evaluate the photocatalytic activity of the obtained crystalline titanium oxide film. More specifically, the crystalline titanium oxide film formed titanium metal sheet (hereinafter referred to as "Test Sample") was immersed in a reaction container containing 0.2 M potassium-iodide aqueous solution (30 ml), and then was irradiated from an upper portion of the reaction container using a fluorescent light (product name: Black Light, a product of Toshiba Corporation) for 120 minutes with light rays having a wavelength capable of exciting anatase-type titanium oxide. The ultraviolet ray intensity at the sample surface was 1.68 mW/cm$^2$ during irradiation. During the irradiation, the $I_3^-$ion concentration in the reaction container was measured as time passed. The $I_3^-$ions are reaction products generated by the photo-oxidation reaction of iodide ions. Further, for comparison, photocatalytic activity was similarly measured for a titanium metal sheet film obtained by subjecting a titanium metal sheet to the formation of a crystalline titanium oxide film (anodization) under the same conditions as described above, without subjecting it to titanium nitride formation.

Figure 2:
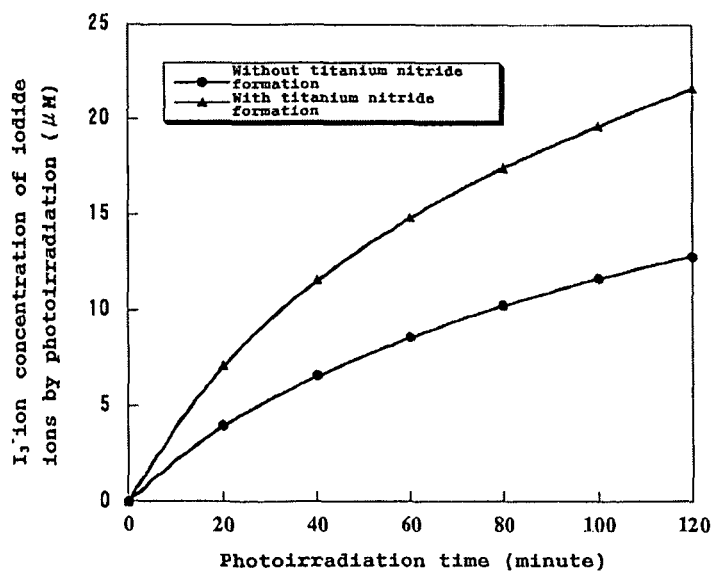
FIG. 2 is a view showing the photocatalytic activities of a crystalline titanium oxide film produced using the electrolyte 2 (an aqueous solution containing 1.5 M sulfuric acid, 0.1 M phosphoric acid, and 0.3 M hydrogen peroxide) in Example 3. The photocatalytic activities were evaluated by measuring the oxidation amount of iodide ion by photoirradiation ($I_3^-$ ion concentration: μM).

The results are shown in FIGS. 1 and 2. FIG. 1 illustrates the photocatalytic activity of the crystalline titanium oxide film formed with electrolyte 1. FIG. 2 illustrates the photocatalytic activity of the crystalline titanium oxide film formed with electrolyte 2. The results indicate that a crystalline titanium oxide film having a high photocatalytic activity can be obtained by forming titanium nitride under the specified conditions prior to anodization.

Example 4

1. Pretreatment of Metal Titanium Sheet and Formation of Titanium Nitride

Metal titanium sheets (19.8 cm$^2$ in surface area, and 1 mm in thickness) were pre-treated and titanium nitride was formed in the same manner as described above in Example 2, "1. Pretreatment of Titanium Metal Sheet" and "2. Formation of Titanium Nitride".

2. Formation of Crystalline Titanium Oxide Film

Metal titanium sheets having titanium nitride formed thereon were immersed in electrolytes 1 or 3. The titanium metal sheet was connected to an anode and another titanium metal sheet was connected to a cathode, and anodization was performed using a direct-current power source. The applied voltage was raised at a rate of 95 mV/s to 150 V and maintained at a fixed voltage for 10 minutes. During anodization, no spark discharge was observed. A crystalline titanium oxide film was thus formed on a metal titanium sheet.
Electrolyte 1: Aqueous solution comprising 1.5 M sulfuric acid, 0.3 M phosphoric acid, and 0.3 M hydrogen peroxide.
Electrolyte 3: Aqueous solution comprising 3.0 M sulfuric acid, 0.3 M phosphoric acid, and 0.3 M hydrogen peroxide.

The following tests were performed to evaluate the photocatalytic activity of the obtained crystalline titanium oxide film. More specifically, the crystalline titanium oxide film formed titanium metal sheet (hereinafter referred to as "Test Sample") was irradiated using a fluorescent light (trade name: Black Light, a product of Toshiba Corporation) for 4 hours with the light having a wavelength capable of exciting anatase-type titanium oxide. The ultraviolet light intensity at the sample surface during irradiation was 1.60 mW/cm$^2$. During the irradiation, the water contact angle of the sample surface was intermittently measured.

Figure 3:
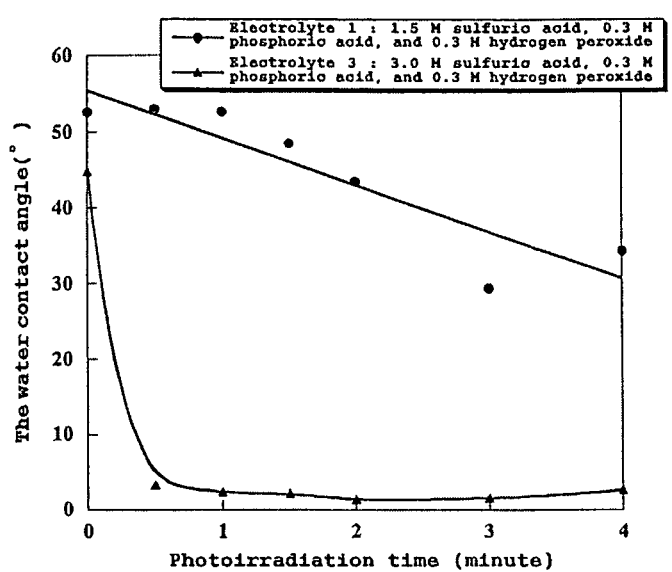
FIG. 3 is a view showing the photocatalytic activities of a crystalline titanium oxide film produced using the electrolyte 1 (an aqueous solution containing 1.5 M sulfuric acid, 0.3 M phosphoric acid, and 0.3 M hydrogen peroxide) or electrolyte 3 (an aqueous solution containing 3.0 M sulfuric acid, 0.3 M phosphoric acid, and 0.3 M hydrogen peroxide) in Example 4. The photocatalytic activities were evaluated by measuring the changes in the water contact angle by photoirradiation.

The results are shown in FIG. 3. The results reveal that the crystalline titanium oxide film formed in Example 3 has a low water contact angle due to the photoinducing photocatalytic activity. The crystalline titanium oxide film obtained with electrolyte 3 has a contact angle of 5° or less after 30 minutes of light irradiation, and exhibits high hydrophilicity.

Example 5

1. Pretreatment of Titanium Metal Sheet

Titanium metal sheets (19.8 cm$^2$ in surface area and 1 mm in thickness) were immersed in n-hexane to subject the same to a degreasing treatment.

2. Formation of Titanium Nitride

Titanium nitride was formed on the surface of the pretreated titanium metal sheet by subjecting the sheet to a PVD treatment using an ion plating method following known steps.

3. Formation of Crystalline Titanium Oxide Film

Metal titanium sheets having titanium nitride formed thereon were immersed in an aqueous solution containing 1.5 M sulfuric acid, 0.1 M phosphoric acid, and 0.3 M hydrogen peroxide. Afterwards, the titanium metal sheet was connected to an anode and another titanium metal sheet was connected to a cathode, and anodization was performed using a direct-current power source. The applied voltage was raised at a rate of 95 mV/s to 150 V and maintained at a fix voltage for 10 minutes. During anodization, no spark discharge was observed. A crystalline titanium oxide film was thus formed on a titanium metal sheet.

The photovoltaic properties of the obtained crystalline titanium oxide film were evaluated using the methods described below. More specifically, the crystalline titanium oxide film was immersed in the following dye solution to form a color coating. The photovoltaic properties of the titanium oxide film, which was coated with a dye, were measured using the test equipment described below and using the following electrolyte and platinum-sputtered ITO (Indium Tin Oxide) as the counter electrode.
Dye Solution
0.0003 M ruthenium-based-dye (tradename: "535-bisTBA", a product of Solaronix Co., Ltd.)-containing acetonitrile/t-butanol mixed-solution (mixing ratio: 50/50 by volume ratio)
Electrolyte
An aqueous solution containing 0.1 M lithium iodide, 0.05 M iodine, 0.5 M TBA (tetrabutyl ammonium), and 0.6 M of an organic iodide salt (1-propyl-2,3-dimethylimidazolium iodide)
Testing Device
Photovoltaic property evaluation device (spectrometer, light source: xenon lamp) (CLR-25, a product of Bunkoh-Keiki Co., Ltd.)

Figure 4:
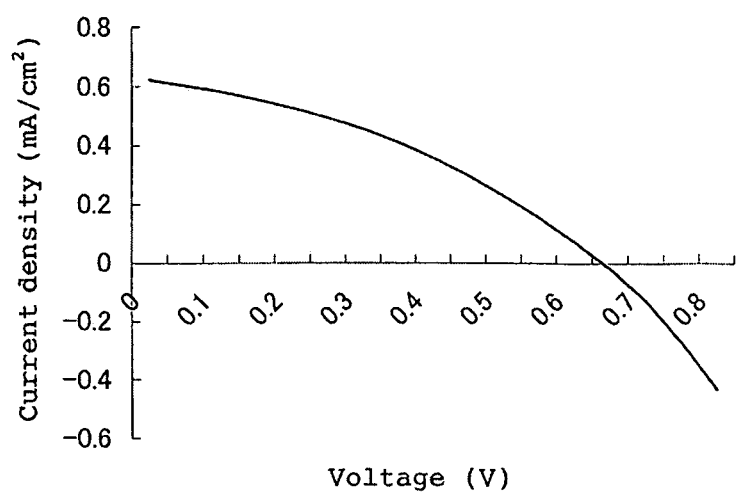
FIG. 4 is a view showing the photovoltaic properties of a crystalline titanium oxide film obtained in Example 5.

The results are shown in FIG. 4. The results reveal that the crystalline titanium oxide film of the invention can be used as a photovoltaic element.

The invention claimed is:
1. A process for producing a crystalline titanium oxide film including an anatase-type oxide, the process comprising the following steps (a-1) and (b):
(a-1) a step of forming titanium nitride on the surface of a sheet of titanium or titanium alloy, which includes:
placing the sheet of titanium or titanium alloy on a carbon plate in an atmosphere;
placing another carbon plate on the sheet of titanium or titanium alloy;
reducing pressure of the atmosphere surrounding the sheet of titanium or titanium alloy arranged between the carbon plate and the another carbon plate to 10 Pa or less by discharging atmospheric gas;

introducing nitrogen gas and/or ammonia gas into the atmosphere surrounding the sheet of titanium or titanium alloy arranged between the carbon plate and the another carbon plate, and heating the sheet of titanium or titanium alloy arranged between the carbon plate and the another carbon plate at 750° C. to 1050° C. and forming the titanium nitride on the surface of the sheet of the titanium or titanium alloy, the carbon plates acting as an oxygen trapping agent during the nitriding; and (b) a step of immersing the sheet of nitrided titanium or titanium alloy obtained in step (a-1) above in an electrolyte containing an inorganic acid and/or organic acid, applying voltage, and anodizing the titanium nitride to titanium oxide.

2. The process for producing a crystalline titanium oxide film according to claim 1, wherein the inorganic acid and/or organic acid used in step (b) etches the sheet of titanium or titanium alloy.

3. The process for producing a crystalline titanium oxide film according to claim 1, wherein voltage equal to or higher than the spark discharging voltage is applied for the anodization in step (b).

4. The process for producing a crystalline titanium oxide film according to claim 1, wherein the electrolyte used in step (b) contains at least one acid selected from the group consisting of sulfuric acid, phosphoric acid, and hydrofluoric acid.

5. The process for producing a crystalline titanium oxide film according to claim 1, wherein the electrolyte used in step (b) further comprises hydrogen peroxide.

6. The process for producing a crystalline titanium oxide film according to claim 1, wherein the crystalline titanium oxide film is a material for a photocatalyst or a photovoltaic element.

7. A process for producing a crystalline titanium oxide film including an anatase-type oxide, the process comprising:

placing a titanium sheet comprising one of titanium and titanium alloy on a carbon sheet;

placing another carbon sheet on the titanium sheet and forming a three-layered structure of a titanium layer comprising the titanium sheet interposed between carbon layers of the carbon sheet and the another carbon sheet;

reducing pressure of atmosphere surrounding the three-layered structure of a titanium layer between carbon layers to 10 Pa or less by discharging atmospheric gas;

introducing nitrogen gas and/or ammonia gas into the atmosphere surrounding the three-layered structure of a titanium layer between carbon layers;

heating the three-layered structure of a titanium layer between carbon layers at 750° C. to 1050° C. and forming titanium nitride on the surface of the titanium sheet, wherein the carbon sheets act as an oxygen-trapping agent;

immersing the nitrided titanium sheet in an electrolyte containing an inorganic acid and/or organic acid; and anodizing the nitrided titanium sheet by applying a voltage through the electrolyte.

* * * * *